United States Patent [19]

Boyce

[11] Patent Number: 5,778,143
[45] Date of Patent: Jul. 7, 1998

[54] METHOD AND APPARATUS FOR THE SELECTION OF DATA FOR USE IN VTR TRICK PLAYBACK OPERATION IN A SYSTEM USING PROGRESSIVE PICTURE REFRESH

[75] Inventor: Jill MacDonald Boyce, Manalapan, N.J.

[73] Assignee: Hitachi America, Ltd., Tarrytown, N.Y.

[21] Appl. No.: 298,015

[22] Filed: Aug. 30, 1994

Related U.S. Application Data

[63] Continuation-in-part of Ser. No. 293,639, Aug. 19, 1994, Pat. No. 5,623,344, and Ser. No. 228,949, Apr. 18, 1994, which is a continuation of Ser. No. 4,158, Jan. 13, 1993, abandoned, said Ser. No. 293,639, is a continuation-in-part of Ser. No. 3,930, Jan. 13, 1994, abandoned, and Ser. No. 3,889, Jan. 13, 1993, Pat. No. 5,377,051.

[51] Int. Cl.[6] .............................. H04N 5/76; H04N 7/12; G11B 5/00
[52] U.S. Cl. ........................ 386/111; 360/32; 348/384
[58] Field of Search .......................... 358/335, 342, 358/310, 311, 712; 360/32, 33.1, 10.1, 10.3; 348/384, 420

[56] References Cited

U.S. PATENT DOCUMENTS

| 3,934,268 | 1/1976 | Uemura . |
| 4,031,548 | 6/1977 | Kato et al. . |
| 4,139,867 | 2/1979 | Foerster . |

(List continued on next page.)

FOREIGN PATENT DOCUMENTS

| A-0367264 | 5/1990 | European Pat. Off. . |
| A-0469842 | 2/1992 | European Pat. Off. . |
| A-0509594 | 10/1992 | European Pat. Off. . |
| A-0562845 | 9/1993 | European Pat. Off. . |
| A-4-14973 | 1/1992 | Japan . |
| A-5-137114 | 6/1993 | Japan . |

OTHER PUBLICATIONS

Drafts of Recommendation H.262,ISO/IEC 13818–1 titled "Information Technology—Generic Coding of Moving Pictures and Associated Audio", (Nov. 1993 ISO–MPEG Committee draft).

(List continued on next page.)

General Instrument Corporation Videocipher Division, "Digicipher HDTV System Description", Document No. 62004, Aug. 22, 1991.

Richard Brush, "Design considerations for the D-2 NTSC composite DNTR", pp. 182–193, SMPTE Journal, Mar. 1988.

*Primary Examiner*—Andrew Faile
*Assistant Examiner*—Robert Chevalier
*Attorney, Agent, or Firm*—Michaelson & Wallace; Michael P. Straub; Peter L. Michaelson

[57] ABSTRACT

Method and apparatus for generating a fully intra-coded video frame from a received progressive refresh bitstream representing a series of inter-coded video frames. Intra-coded macroblocks of received video frames are identified, selected, processed and stored to facilitate later combination into a single fully intra-coded composite video frame suitable for use during VTR trick play operation. As part of the intra-coded macroblock selection process, in various embodiments, the large sets of adjacent macroblocks are given priority over previously selected macroblocks that correspond to non-adjacent positions within a video frame or which correspond to a smaller set of adjacent video frames. As part of the macroblock processing performed prior to storage of selected intra-coded macroblocks, the amount of data used to represent each intra-coded macroblock is reduced and the macroblocks are processed so as to be represented in a consistent manner which facilitates the subsequent combination of intra-coded macroblocks from different frames into a single low resolution frame suitable for use during trick play operation.

24 Claims, 3 Drawing Sheets

U.S. PATENT DOCUMENTS

| | | |
|---|---|---|
| 4,193,098 | 3/1980 | Bixby et al. |
| 4,263,623 | 4/1981 | Woo et al. |
| 4,290,087 | 9/1981 | Bixby et al. |
| 4,339,775 | 7/1982 | Lemke et al. |
| 4,355,324 | 10/1982 | Reitmeier |
| 4,392,162 | 7/1983 | Yamamoto |
| 4,504,869 | 3/1985 | Warren |
| 4,510,538 | 4/1985 | Sato et al. |
| 4,541,020 | 9/1985 | Kimura |
| 4,558,376 | 12/1985 | Heitmann |
| 4,584,613 | 4/1986 | Amari et al. |
| 4,636,874 | 1/1987 | Hoogendoorn et al. |
| 4,636,879 | 1/1987 | Narita et al. |
| 4,668,998 | 5/1987 | Aoki |
| 4,783,707 | 11/1988 | Nemoto et al. |
| 4,807,053 | 2/1989 | Heijnemans |
| 4,825,301 | 4/1989 | Pape et al. |
| 4,887,169 | 12/1989 | Bannai et al. |
| 4,910,605 | 3/1990 | Sasaki et al. |
| 4,985,781 | 1/1991 | Hirasawa |
| 5,027,235 | 6/1991 | Furuyama |
| 5,047,869 | 9/1991 | Aoki et al. |
| 5,050,014 | 9/1991 | Maeda et al. |
| 5,065,259 | 11/1991 | Kubota et al. |
| 5,097,363 | 3/1992 | Takei et al. |
| 5,119,208 | 6/1992 | Fujimoto |
| 5,126,852 | 6/1992 | Nishino et al. |
| 5,132,807 | 7/1992 | Takimoto et al. |
| 5,134,464 | 7/1992 | Basile et al. |
| 5,136,391 | 8/1992 | Minami |
| 5,136,394 | 8/1992 | Haikawa et al. |
| 5,140,417 | 8/1992 | Tanaka et al. |
| 5,140,437 | 8/1992 | Yonemitsu et al. |
| 5,144,425 | 9/1992 | Joseph |
| 5,146,337 | 9/1992 | Grubbs |
| 5,148,272 | 9/1992 | Acampora et al. |
| 5,212,549 | 5/1993 | Ng et al. |
| 5,218,449 | 6/1993 | Ko et al. |
| 5,225,946 | 7/1993 | Uchiumi |
| 5,282,049 | 1/1994 | Hatakenaka et al. |
| 5,291,343 | 3/1994 | Goto |
| 5,355,229 | 10/1994 | Arano et al. |

OTHER PUBLICATIONS

Drafts of Recommendation H.262,ISO/IEC 13818-2 titled "Information Technology—Generic Coding of Moving Pictures and Associated Audio", (Nov. 1993 ISO–MPEG Committee draft).

Ho, Yo–Sung, et al. "MPEG–Based Video Coding for Digital Simulcasting," International Workshop on HDTV '92, Nov. 18–20, 1992, Proceedings vol. 1, pp. 141–148.

Robert Rast, Joseph Glaab, General Instrument Corporation, "Interoperability Considerations for Digi Cipher HDTV", Oct. 1, 1992.

Sun, H., et al. "Error Concealment in Digital Simulcast AD–HDTV Decoder," IEEE Transactions on Consumer Electronics, vol. 38, No. 3, Aug. 1992, pp. 108–118.

J. Lee, J. Seo, Y. Park, D. Youn, T. Oh, IEEE Transactions on Consumer Electronics, "A Study on New DCT–Based Bit Rate Reduction Algorithm and Variable Speed Playback for a Home–Use Digital VCR", vol. 38, No. 3, Aug. 1992, pp. 236–241.

Advanced Television Research Consortium, "Advanced Digital Television, Prototype Hardware Description", Feb. 12, 1992.

David Sarnoff Research Center, Philips Laboratories, "Advanced Digital Television, System Description", Jan. 20, 1992.

I.S.O. MPEG (Moving Pictures Expert Group), "Coding of Moving Pictures and Associated Audio for Digital Storage Media at up to about 1.5 Mbit/s, Part 2 Video", 2–11172 rev 1, Nov. 23, 1991.

Zenith, AT&T, "Technical Details, Digital Spectrum Compatible", Sep. 23, 1991.

C. Yamamitsu, A. Ide, M. Nishino, T. Juri, H. Ohtaka, IEEE Transactions on Consumer Electronics, "A Study on Trick Plays for Digital VCR", vol. 37, No. 3, Aug. 1991, pp. 261–266.

S. Inoue, H. Kaneko, H. Takao, T. Fujii, M. Ishibashi, IEEE Transactions on Consumer Electronics, "New Method for Variable Speed Playback for High Definition VCRs", vol. 37, No. 3, Aug. 1991, pp. 244–251.

METHOD AND APPARATUS FOR THE SELECTION OF DATA FOR USE IN VTR TRICK PLAYBACK OPERATION IN A SYSTEM USING PROGRESSIVE PICTURE REFRESH

RELATED APPLICATION

This is a continuation-in-part of pending U.S. patent application Ser. No. 08/293,639 filed on Aug. 19, 1994 which is a continuation-in-part of now abandoned U.S. patent applications Ser. Nos. 08/003,930 and 08/003,889 both of which were filed on Jan. 13, 1993; and. is a continuation-in-part of pending U.S. patent application Ser. No. 08/228,949, filed Apr. 18, 1994 which is a continuation of U.S. patent application Ser. No. 08/004,158, filed Jan. 13, 1993, now abandoned. Each of the above referenced patent applications is hereby expressly incorporated by reference.

FIELD OF THE INVENTION

The present invention is directed to data extraction techniques and, more particularly, to a method and apparatus for extracting data from a video bitstream and arranging the data into frames suitable for use during video tape recorder ("VTR") trick play operation.

BACKGROUND OF THE INVENTION

Generally, VTRs are designed to receive and store data signals representing video (and audio information) by recording the data on a magnetic tape in a series of tracks. In addition, most VTRs are designed to support both normal and trick playback operation, i.e., fast forward and reverse operation. The use of digital video Signals, e.g., digital high definition television ("HDTV") signals, which are normally transmitted in a compressed format, present problems with regard to the implementation of trick playback operation in VTRs.

Various systems have been proposed that would locate data selected to be used during trick play operation in specific locations within the tracks on a tape so that at least a minimum amount of data required to produce recognizable images during trick playback operation can be read in a reliable manner from the tape. However, because of limitations on the amount of data that can be read back from the tape during trick play operation using such systems, video images used during trick play operation must usually be represented using considerably less data than is used to represent images, e.g., frames, that are displayed during VTR normal playback operation.

Accordingly, because of the data constraints imposed during trick playback operation, It is important that the data used to represent video frames during trick playback operation be carefully selected.

Thus, the proposed digital VTR systems offer a number of possible solutions to the problem of how to record digital data on a tape so that it can be read from the tape in a reliable manner during trick play. However, there is still a need for an improved method and apparatus for selecting data from a compressed video data stream to represent a video frame that can be recorded on the video tape and read back and displayed during trick playback operation.

Because the method of selecting data from a video data stream for use during trick playback operation will depend In large part on the content of the compressed video data stream from which the data must be selected, it is important to have an understanding of the various elements of a compressed digital video data stream, how those elements, e.g., video frames, slices, macroblocks, motion vectors, DCT coefficients, etc., relate to each other, and how the compressed video data stream is originally created.

The International Standards Organization has set a standard for video data compression that is suitable for generating a compressed digital data stream such as a digital HDTV data stream. This standard is referred to as the ISO MPEG-2(International Standards Organization—Moving Picture Experts Group) ("MPEG-2") standard.

While various versions of this data compression standard exist, and new versions are expected in the near future, all versions of the MPEG-2 standard are expected to use the same basic data compression techniques. For the purposes of this application, unless indicated otherwise, terms will be used in a mariner that is consistent with the MPEG-2 standard that is described in the International Standards Organization—Moving Picture Experts Group, Draft of Recommendation H.262, SO/IEC 13818-2 titled "Information Technology—Generic Coding Of Moving Pictures and Associated Audio" (hereinafter "the November 1993 ISO-MPEG Committee draft") hereby expressly incorporated by reference. Any references made in this patent application to MPEG-2 data streams is to be understood to refer to data streams that comply with MPEG-2 standards as defined in the November 1993 ISO-MPEG Committee draft.

In accordance with the MPEG standard, analog video signals are digitized and compressed in accordance with an MPEG data compression algorithm to produce the digital video data stream.

In accordance with the MPE data compression algorithm, after the analog video signals are digitized, the digital data is organized into macroblocks and the macroblocks are then encoded.

In accordance with the MPE standard, within a given frame, each macroblock may be coded using one of several different encoding techniques, e.g., motion compensation techniques. Intra-frame coding refers to a macroblock coding technique in which only spatial information is used. Intra-coded macroblocks are produced using this coding technique.

Inter-frame coding, unlike intra-frame coding, uses motion compensation techniques which utilize data from other frames when performing the encoding operation. Accordingly, inter-coded macroblocks which are produced using inter-frame coding techniques are dependent on preceding and/or subsequent frames and include motion vectors which are the result of the motion compensation operation. The MPEG-2 standard allows for the optional use of both intra-coded and inter-coded macroblocks in a video frame.

In accordance with the MPEG compression algorithm, after motion vectors have been calculated in video frames that are to be inter-coded, each of the intra-coded and inter-coded macroblocks which comprise the video data are transform encoded by performing a discrete cosine transform ("DCT") operation. As a result of the DCT operation, blocks of DCT coefficients are produced. These coefficients include both DC and higher frequency (AC) coefficients.

After performing the DCT operation, the resulting data is variable length encoded by performing adaptive quantization on the data with the quantization factor mquant used being indicated by header information included in he encoded video data stream that Is produced as a result of the encoding operation.

The MPEG standard provides for the arrangement of macroblocks into slices with each frame being made up of one or more slices. A slice is an integer number of consecutive macroblocks from a raster of macroblocks. Video frames which include only intra-coded macroblocks are referred to as intra-coded ("I-") frames. Video frames which include predictively coded macroblocks are referred to as P-frames the frames which include bi-directionally coded macroblocks are referred to as B-frames. P- and B-frames are, because of the type of encoding used, inter-coded frames.

In accordance with MPEG proposal, frames may be arranged into ordered groups referred to as groups-of-pictures. Normally, when I-frames are used, it is expected that each group-of-pictures will contain at least one I-frame. The use of groups-of-pictures, which is optional in MPEG-2, is intended to assist random access Into the sequence.

To summarize, an MPEG data stream generated using the encoding technique described above, includes a series of variable length encoded video frames, each frame being represented by a series of intra-coded and/or inter-coded macrablocks, where each macroblock includes DCT coefficients and possibly motion vectors. Furthermore, the data representing the video frames may be arranged as groups-of-pictures while the macrblocks representing each video frame may be arranged into slices which represent a portion of a frame.

Because MPEG-2 allows for a wide latitude in the encoding techniques used, an MPEG-2 data stream may include I-frames on a routine basis or may not include any routine I- frames.

When I- frames are used at regular intervals, e.g., every ninth frame, the picture will be refreshed on a regular basis.

In the case where intra-coded frames are not used at regular intervals it is expected that progressive refresh will be used instead of I- frames. Both modes of refreshing the picture are allowed within MPEG-2.

When progressive refresh is used, within a certain period of time, each macroblock in the picture is coded intra at least once. The intra-coded macroblocks may occur in a regular pattern, e.g., the first row of macroblocks is forced to be intra in the first frame, the second row of macroblocks is forced to be intra in the second frame, etc. However, a regular pattern is not required and is not expected to be known by a decoder or VTR.

In addition to permitting I-frames or progressive refresh to be used, MPEG-2 also allows for various other encoding options that complicate the selection of data for use during trick play. For example, MPEG-2 permits DC coefficients to be represented with 8, 9 or 10 bits of precision, it also permits pictures to be represented in a field picture format or a frame picture format. In addition, MPEG-2 provides two different patterns to be used for converting a 2-dimensional DCT block into a 1-dimensional sequence, the default being a zig-zag scan pattern with the optional alternative being an alternate_scan pattern. It also provides two different tables of quantization scale factor (mquant) values to be used to encode the video data, i.e., a default $q_{13}$ scale_type table and an alternate $q_{13}$ scale_type table. MPEG-2 also allows for a change of the quantization matrix from a default quantization matrix.

For a more detailed discussion of the above possible variations between MPEG-2 encoded bitstreams, see the November 1993 ISO-MPEG Committee draft referred to above.

Because intra-coded frames can be decoded without data from other frames, they are particularly well suited for used during trick play. Accordingly, it is desirable to use fully intra-coded video frames for trick play operation. However, in the progressive refresh case, fully intra-coded frames occur infrequently and at non-random intervals making it difficult to obtain a sufficient number of fully intra-coded video frames directly from the video bitstream received by a VTR to provide enough fully intra-coded frames to support trick play operation.

Accordingly, there is a need for a method and apparatus that can process a compressed video bitstream, such as an MPEG-2 video bitstream, in the progressive refresh case, to produce a sufficient number of fully intra-coded video frames to support trick play operation.

Furthermore, it is desirable that the fully intra-coded trick play video frames produced by such a method and apparatus require less data to store than comparable fully intra-coded frames intended to be displayed during VTR normal play operation.

Accordingly, there is a need for a method and apparatus that can select data for use during trick play operation from a compressed video da:a stream that does not include I-frames at regular intervals, and generate fully intra-coded frames suitable for use during trick play operation therefrom.

SUMMARY OF THE PRESENT INVENTION

The present invention is directed to methods and apparatus for extracting data From a video bitstream including a plurality of inter-coded video frames and for arranging the data to form fully intra-coded frames which are suitable for use as trick play video frames.

These composite fully intra-coded frames can then be recorded on a tape and later read back during VTR trick play operation to provide data sufficient to produce recognizable images or portions of images during trick play operation.

In accordance with the present invention intra-coded macroblocks of received video frames are identified, selected, processed and stored to facilitate later combination into a single fully intra-coded composite video frame suitable for use during VTR trick play operation.

The present invention provides several methods for selecting which intra-macroblocks from the bitstream should be selected for incorporation into a single composite video frame.

In accordance with a first embodiment of the present invention, intra-coded macroblocks are selected in the order they are received, processed and stored in a data storage device. In such an embodiment, each identified intra-coded macroblock is selected and stored in a memory location corresponding to the particular macroblock position within a frame to which the selected macroblock corresponds. Subsequently identified macroblocks are recorded in the same manner until intra-coded macroblocks have been stored corresponding to all the macroblock positions of the composite video frame. Intra-coded macroblocks that belong to a later temporal frame overwrite previously stored macroblocks as the process of generating a fully intra-coded frame proceeds if two identified intra-coded macroblocks correspond to the same macroblock position within a frame.

In a second embodiment of the present invention, when the intra-refresh pattern is known, only the intra-coded macroblocks that are the result of a forced refresh are selected for incorporation into the composite video frame.

In accordance with a third embodiment of the present invention, sets of intra-coded macroblocks which include a minimum preselected number of macroblocks which correspond to adjacent positions within a video frame are identified and selected as opposed to merely individual macroblocks. By selecting the minimum number of intra-coded macroblocks to be higher than the number expected to frequently occur at random, but less than the number expected to occur as the result of a forced refresh, the number of randomly occurring Intra-coded macroblocks selected for incorporation into the composite fully intra-coded video frame being generated as reduced as compared to the first embodiment.

The present invention provides for other embodiments described in detail below.

In accordance with one embodiment of the present invention, after each macroblock is selected to be stored, it is processed, e.g., so that the amount of data used to represent each intra-coded macroblock is reduced and so that the macroblocks are processed so as to be represented in a consistent manner which facilitates the subsequent combination of intra-coded macroblocks from different frames into a single frame suitable for use during trick play operation.

Once enough intra-coded macroblocks have been stored to represent a fully-intra coded macroblock the stored macroblocks are processed into slices which are then used to form a fully intra-coded frame suitable for use during trick play operation.

Accordingly, by identifying, selecting, processing, storing and combining intra-coded macroblocks from a plurality of inter-coded video frames, the methods and apparatus of the present invention can be used to provide reduced resolution, fully intra-coded frames suitable for use in VTR trick play operation when a progressive refresh bitstream is being used.

DETAILED DESCRIPTION

The present invention is directed to data extraction techniques and, more particularly, to a method and apparatus for extracting data from a video bitstream including a plurality of inter-coded video frames and arranging the data to form fully intra-coded frames. These composite fully intra-coded frames can then be recorded on a tape and later read back during VTR trick play operation to provide data sufficient to produce recognizable images or portions of images during trick play operation.

As discussed above, a video data bitstream may include I-frames that occur at regular intervals or, alternatively, use progressive refresh instead. When progressive refresh is used, within a certain period of time, each macroblock in the picture is coded intra at least once. In such a system, it is expected that within a 15 frame period, all macroblocks will be intra-coded at least once in order to insure satisfactory picture quality. The intra-coded macroblocks may occur in a regular pattern, e.g., the first row of macroblocks is forced to be intra in the first frame, the second row of macroblocks is forced to be intra in the second frame, etc. However, a regular pattern is not required and is not expected to be known by a decoder or VTR.

During trick play operation, it is desirable to display one frame, referred to as a trick play frame, for every N frames displayed during normal play operation, where N is a positive number corresponding to the speed up during trick play operation. For example, in 9× fast forward operation, it is desirable to display one trick play frame for every 9 normal play video frames.

Because of the data constraints imposed by digital tape recording systems during trick play operation, it is important that the data used to represent trick play frames include only intra-coded data and that the amount of data used to represent each trick play frame be less than the amount of data that would be required to represent a normal play video frame as a fully intra-coded video frame.

In the case of progressive refresh, each video frame is likely to contain some intra-coded macroblocks. However, fully Intra-coded video frames are not routinely available. Since complete I-frame are needed for trick play operation, and are not readily available from the bit stream expected to be received by a VTR, in the case of progressive refresh, a method and apparatus are required for generating the required intra-coded trick play video frames from the received data.

In the case of progressive refresh, it is desirable to make as much use of the intra information contained in the received bit stream as possible, when selecting data to be used to represent trick play video frames. Furthermore, the intra-coded data from the data representing the normal play inter-coded video frames received by the VTR should be combined in a manner that provides the best quality trick play video frame possible.

Figure 1:
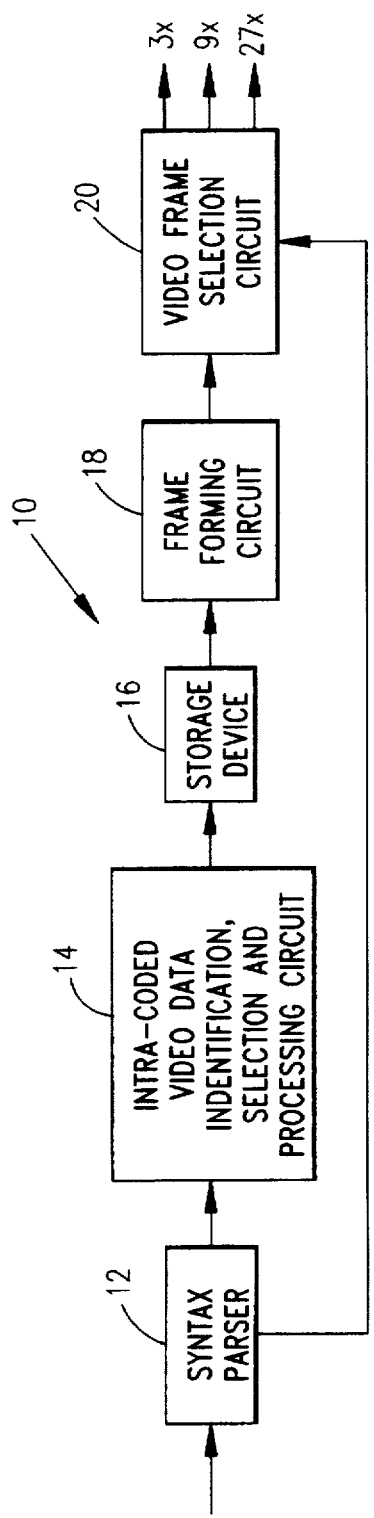
FIG. 1 is a schematic block diagram of a data extraction and frame forming circuit in accordance with one embodiment of the present invention.

Referring now to the drawings, and initially to FIG. 1, there is illustrated a data extraction and frame forming ("DEFF") circuit, generally indicated by the reference numeral 10, implemented in accordance with one embodiment of the present invention. As will be discussed below, the DEFF circuit 10 is suitable for receiving an encoded video bitstream, e.g., an MPEG-2 compliant bitstream, identifying intra-coded data, e.g., macroblocks within the bitstream and generating fully intra-coded video frames from the received data contained in the bitstream by, e.g., combining intra-coded macroblocks from several intra-coded frames into a single composite intra-coded video frame suitable for use during VTR trick play operation.

The DEFF circuit 10, comprises a syntax parser circuit 12, an intra-coded video data identification, selection and processing ("IISP") circuit 14, a fixed length storage circuit 16, a frame forming circuit 18 and a video frame selection circuit 20.

The syntax parser 12 receives the variable length encoded video bitstream which includes a series of inter-coded video frames intended for normal play VTR operation. It also detects the frame to which received video data corresponds and generates a video frame indicator signal that is supplied to the video frame selection circuit indicating the receipt of video data corresponding to each new video frame. The syntax parser 12 parses the bitstream to identify data representing different video frames and to generate as its output MPEG coding elements, e.g., macroblocks, motion vectors, DC and AC DCT coefficients, etc. The syntax parser 12 may be thought of as performing a partial variable length decode operation in that individual MPEG coding elements are identified in the variable length encoded data stream. However, this parsing operation which is relatively simple to implement should not be confused with performing a full variable length decoding operation ("VLD" operation) as described below which is more difficult to implement.

The IISP circuit 14 has an input coupled to the output of the syntax parser 12. In his manner, the IISP circuit 14 receives the MPEG coding elements which represent a series of video frames. As will be discussed in more detail below, the IISP circuit 14 identifies the intra-coded macroblocks of each received video frame, selects from the identified intra-coded macroblocks which macroblocks to store for inclusion in a composite fully intra-coded video frame, and processes the selected intra-coded macroblocks into a format that makes them suitable for storage and which facilitates their later combination with other macroblocks into a single fully intra-coded frame.

The IISP circuit 14 outputs the selected and processed intra-coded macroblocks to the storage device 16 which is used to store intra-coded macroblocks until they are ready to be combined into a single composite fully intra-coded video frame by the frame forming circuit 18.

Since, in the case of progressive refresh, intra-coded macroblocks are selected from a plurality of video frames, it is necessary to store the selected macroblocks, e.g., in the storage device 16, until enough intra-coded macroblocks have been selected to form a fully intra-coded frame.

The intra-coded macroblocks supplied by the IISP circuit 14 to the storage device 16 may come from any section of the image and are coded using variable length codes. Accordingly, to facilitate the creation of the composite intra-coded macroblock, the selected intra-coded macroblocks should be stored in such a way that each macroblock is individually accessible. This differs from the case where I-frames are provided at regular intervals where such individually accessible storage is unnecessary since all of the macroblocks, arrive in order, and there is no need to identify the Location where any particular macroblock's data resides in memory.

In accordance with the present invention, in one embodiment, the storage device 16 includes, for each one of the possible macroblocks positions within a video frame, a memory location having a fixed size. In this manner, the storage device 16 includes one individually accessible memory location for each macroblock of the composite video frame. While fixed size memory locations are used in the described embodiment, it is also possible to implement the storage device 16 using variable size memory locations.

The size of each of the individual memory locations of the storage device 16 must be large enough to store the largest amount of macroblock information that may be required to be stored for any given macroblock.

The fixed storage space for each macroblock could store either the variable length representation of the macroblock, or a fixed length representation with the variable length representation being a Huffman coding of the fixed length representation. Since the worst case variable length coding of a macroblock is longer than its fixed length, in accordance with one embodiment, the macroblocks are stored using a fixed length representation. In such an embodiment, the IISP circuit 14, processes each intra-coded macroblock selected for storage to convert it from a variable length representation to a fixed length representation prior to supplying it to the storage device 16.

As illustrated in FIG. 1, the frame forming circuit 18 has an input coupled to the output of the fixed length storage device 16 for receiving therefrom the intra-coded macroblocks stored therein. The frame forming circuit 18 combines the intra-coded macroblocks received from the storage device 16 into slices which are then combined to form fully intra-coded video frames which represent a composite of a plurality of video frames included in the originally received bitstream.

Via its coupling to the storage device 16, the frame forming circuit 18 can obtain from the storage device 16, the intra-coded macroblocks stored therein and generate a fully intra-coded frame therefrom as required to support the various modes, e.g., speeds of trick play operation supported by a video tape recorder incorporating the circuit 10 of the present invention. For example, the frame forming circuit 18 may generate a fully-intra-coded frame, using the data stored in the storage device 16, at a rate equal to or greater than the rate required to support the lowest speed of trick play operation supported by the circuit 10 of the present invention.

Each fully intra-coded video frame output by the frame forming circuit 18 is supplied to the input of the video frame selection circuit 20. The video frame selection circuit 20 selects, as a function of the video frame indicator signal output by he syntax parser, when the fully intra-coded video frame generated by the frame forming circuit 18 is to be used during each of a plurality of different trick play speeds of operation, e.g., 3×, 9× and 27× fast forward or reverse speeds of operation, and outputs these frames, e.g., via the corresponding outputs. For example, every time the video frame selection circuit determines that three video frames have been received by the syntax parser 2, e.g., by counting that the video frame indicator signal has been asserted three times since the last time a video frame was supplied to the 3× speed output, the video frame selection circuit outputs the frame generated by the frame forming circuit 18. Similarly, the video frame selection circuit may output one frame to the 9× output every nine times the video frame indicator signal is asserted.

In an alternative embodiment when the average time of a video frame is known, the video frame selection circuit uses the video frame indicator signal as a synchronization signal and supplies frames generated by the frame forming circuit 18 to the different speed outputs as a function of the amount of time that passes.

For example, when sufficient time passes to have displayed three video frames, the frame generated by the frame forming circuit 18 is supplied to the 3× speed output of the video frame selection circuit 20 for recording e.g., in a 3× fast scan track segment. Using this timed approach frames may be selected and output at non-integer multiples of the number of received video frames to support non-integer trick play speeds of VTR operation, e.g., 2.5 times fast forward speed, etc. Furthermore, in this embodiment, the syntax parser 12 need not generate a video frame indicator signal.

The fully intra-coded digital video frames output via the various speed outputs of the video frame selection circuit can be supplied to one or more buffers prior to recording on a tape in specific tape locations which are arranged to be read during VTR trick play operation when the VTR operates at the specific speeds and directions of trick play for which the data frames are selected.

Figure 2:
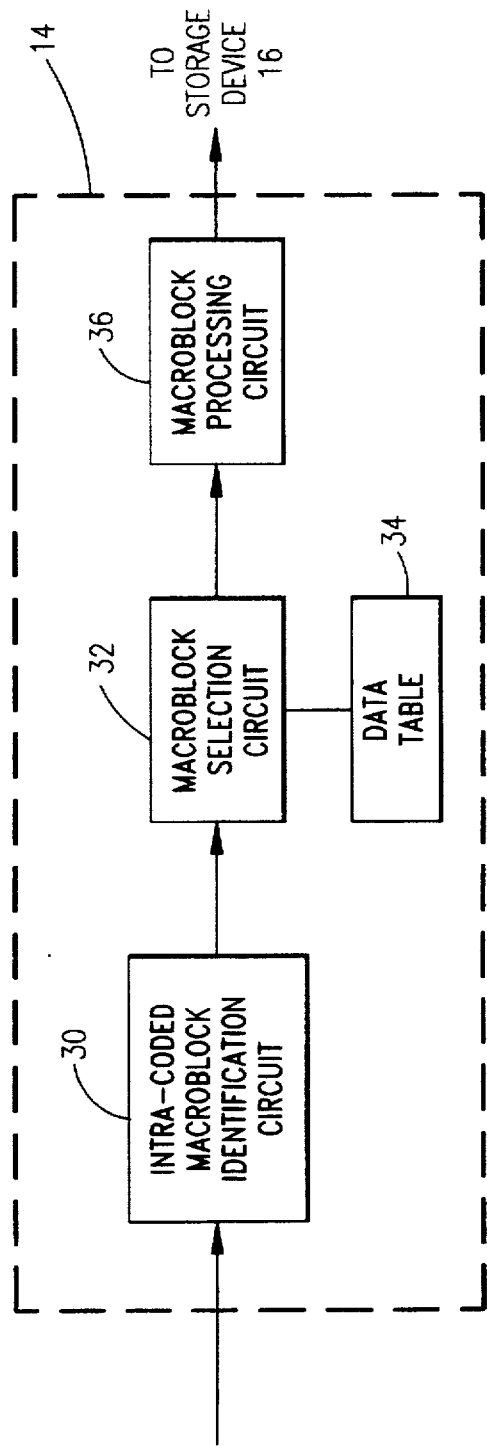
FIG. 2 is a schematic block diagram of an exemplary intra-coded data identification, selection and processing circuit suitable for use with the data extraction and frame forming circuit illustrated in FIG. 1.

The operation of the IISP circuit 14 will now be described in greater detail with reference to FIG. 2.

As illustrated, the IISP circuit 14 comprises an intra-coded macroblock identification circuit 30, a macroblock selection circuit 32, a data table 34 and a macroblock processing circuit 36.

The intra-coded macroblock identification circuit 30 receives the MPEG coding elements output by the syntax parser 12 and identifies individual intra-coded macroblock and/or sets of adjacent intra-coded macroblocks that correspond to each of the received video frames. The identified intra-coded macroblocks are then supplied to the macroblock selection circuit 32 which is responsible For selecting which of the identified intra-coded macroblocks are to be processed and stored in the fixed length storage device 16.

As stated earlier, when progressive refresh is used, intra-coded macroblocks will occur throughout several frames, and they need to be identified, selected, processed and combined to form one fully intra-coded frame suitable for trick play. While the intra-coded macroblocks may be forced to occur in a regular pattern, a regular pattern is not required and will probably be unknown to the VTR even if such a pattern exists. Significantly, intra-coded macroblocks other than those that are being forced intra for refresh purposes will occur on an irregular basis as the result of the original encoding process. For each intra-coded macroblock that arrives a decision must be made on whether it will be selected for storing in the storage device 16 for possible inclusion in the fully intra-coded frame being produced.

In accordance with a first embodiment of the present invention, intra-coded macroblocks are selected in the order they are received, processed and stored in the data storage device 16. In such an embodiment, each identified intra-coded macroblock is selected and stored in the memory location corresponding to the particular macroblock position within a frame to which the selected macroblock corresponds. Subsequently identified macroblocks are recorded in the same manner until intra-coded macroblocks have been stored corresponding to all the macroblock positions of the composite video frame. Intra-coded macroblocks that belong to a later temporal frame overwrite previously stored macroblocks as the process of generating a fully intra-coded frame proceeds if two identified intra-coded macroblocks correspond to the same macroblock position within a frame.

Data on the contents of each macroblock memory location is stored in the data table 34. Accordingly, the macroblock selection circuit 32 can determine when it has completed storing enough fully intra-coded macroblocks to represent one complete fully intra-coded video frame.

After a sufficient number of fully intra-coded macroblocks have been stored to represent a complete fully intra-coded video frame have been stored, the process of storing intra-coded macroblocks continues resulting in a constant updating of the macroblocks stored in the storage device 16. Accordingly, as the frame forming circuit 18 repeatedly accesses the stored data to generate fully intra-coded video frames, as required to support the various trick play modes of operation supported by the video frame selection circuit 20, it is constantly receiving updated data which is used to generate a new fully intra-coded video frame.

While the above first embodiment offers one method for selecting intra-coded macroblocks from multiple frames for incorporation into a single composite fully intra-coded video frame, the above method fails to take into consideration the placement of macroblocks within a frame when selecting intra-coded macroblocks to be incorporated into the composite intra-coded frame being generated.

The best trick play image quality is expected to result when a large number of neighboring macroblocks are updated at the same time, e.g., during the same frame. This is particularly important when there is a lot of motion in the image sequence. The trick play image quality is expected to be poor for moving sequences when the intra refresh macroblocks from different video frames are scattered throughout the image rather than being concentrated in one place when data extraction is used with I frames, it is expected that the most recent I frame will typically be used as the trick play frame. But in the progressive refresh case, it is not necessarily desirable that the most recent intra-coded macroblocks be used if this will result in macroblocks from different video frames being scattered throughout the fully intra-coded video frame being generated.

In a progressive refresh scheme, which has a regular intra-refresh pattern, occasional other macroblocks outside of the refresh region will be coded intra. If a regular intra refresh pattern exists, and macroblocks forced intra for a give picture are generally neighboring one-another, it is best to use those, and only those forced intra-coded macroblocks in a trick play frame, i.e., avoid the use the randomly occurring other intra-coded macroblocks.

If the refresh pattern is known, i.e., the refresh pattern corresponds to a preselected refresh pattern, this is easy to accomplish. For example, if frame one has macroblock rows 1-10 intra coded for its refresh pattern, and frame 2 has macroblock row 11-20 coded intra for its refresh pattern, but frame 2 also happens to have a macroblock in row 5 coded intra as well, it is probably better not to overwrite the macroblock in row 5 over the frame 1 data, as that would result in just a single macroblock from a different frame, frame 5, in a section otherwise containing all frame 1 data.

Accordingly, in a second embodiment of the present invention, when the intra-refresh pattern is known, it is programmed into the macroblock selection circuit which then selects only the intra-coded macroblocks that are the result of a forced refresh.

However, when the intra refresh pattern is unknown, such an approach to intra-coded macroblock selection is not possible.

A modification to the first of the above described approaches to selecting intra-coded macroblocks, i.e., merely selecting intra-coded macroblocks in the temporal order in which they occur, offers one approach to minimizing the number of randomly occurring intra-coded macroblocks that are selected by the macroblock selection circuit 32 as opposed to macroblocks which occur as the result of a forced refresh operation.

In accordance with a third embodiment of the present invention, sets of intra-coded macroblocks which include a minimum preselected number of macroblocks which correspond to adjacent positions within a video frame are identified and selected as opposed to merely individual macroblocks. By selecting the minimum number of intra-coded macroblocks to be higher than the number expected to frequently occur at random, but less than the number expected to occur as the result of a forced refresh, the number of randomly occurring intra-coded macroblocks selected for incorporation into the composite fully intra-coded video frame being generated is reduced. Identifying and selecting sets of intra-coded macroblocks which include at least 10 macroblocks which correspond to adjacent positions within a video frame should produce satisfactory results.

As in the case of the first embodiment, the selected macroblocks are processed and stored until enough intra-coded macroblocks have been stored to produce a fully intra-coded frame at which time the data table 34 is cleared and the process of generating a fully intra-coded frame from the received video data is permitted to continue resulting in a constant updating of the data stored in the storage device 16.

A fourth embodiment, uses an approach to selecting macroblocks that is based on identifying all the intra-coded macroblocks that are received and then deciding whether to store each identified macroblock as a function of how long it has been since a particular macroblock location has been refreshed and how many of the neighboring macroblocks of the presently stored macroblock corresponding to a particular location are coded intra with preference being given to many macroblocks being grouped together. Accordingly, this fourth embodiment may be viewed as a combination of the third and first embodiments.

In accordance with this fourth embodiment of selecting intra-coded macroblocks, upon start-up, fully intra-coded macroblocks are stored in the macroblock memory locations in the storage device 16 in the order they are received, and the data table is updated until enough macroblocks are stored to generate a fully intra-coded frame.

Once enough intra-coded macroblocks have been stored to generate a fully intra-coded video frame the data selection process proceeds as described below.

When an intra-coded macroblock arrives, if it is the first intra-coded macroblock for that position since a predetermined number of video frames have been received, e.g., 15 video frames ago which is the time period in which it is expected that all macroblocks will have been forced intra-coded at least once, then the macroblock is selected to be stored. With the storing of the macroblock, the data table 34 is updated to indicate that a macroblock corresponding to the particular location has been stored and to which of the received video frames the stored macroblock corresponds.

Received intra-coded macroblocks are also selected for recording if they belong to a set of adjacent intra-coded macroblocks if certain conditions are met as described below. In accordance with the fourth embodiment, identified sets of adjacent intra-code macroblocks of each received video frame are compared to the stored macroblocks via the use of the data table 34 to determine whether the identified set of macroblocks is larger than a corresponding previously stored set of macroblocks if a subsequently identified set of macroblocks overlaps a set of previously stored intra-coded macroblocks corresponding to the same macroblock positions within a frame and is larger than the previously stored set, then the identified set of macroblocks is stored overwriting the previously stored macroblocks corresponding to the overlapping macroblock positions.

This process of identifying and selecting intra-coded macroblocks from a plurality of received video frames is repeated on an ongoing basis with the intra-coded macroblocks stored in the storage device 16 being supplied to the frame forming circuit 18 as required to meet the needs of the video frame selection circuit 20.

As discussed briefly above, after selection of a macroblock for storage but prior to its storage in the storage device 16, each selected macroblock is processed to facilitate its storage and combination with other intra-coded macroblocks from different frames to produce a single fully intra-coded video frame.

The operation and circuitry of the macroblock processing circuit 36 will now be described with reference to FIG. 3. The macroblock processing circuit 36 is responsible, in various embodiments, to perform processing on the selected macroblocks to, e.g., reduce the amount of data used to represent each macroblock and to insure that macroblocks are represented in a consistent manner that facilitates their subsequent combination into a single frame. Since full resolution of the macroblocks is not required for trick play, the use of lower resolution versions of macroblocks provides a viable way of reducing the amount of memory required to store each selected macroblock and thereby reduce the amount of memory need to implement the storage device 16.

In one embodiment, the DC coefficient for each one of the blocks of a selected macroblock is used to represent the macroblock. in such an embodiment, the macroblock processing circuit 36 is responsible for processing the selected macroblocks to remove the AC DCT coefficients from each selected macroblock before storing in the storage device 16.

Figure 3:
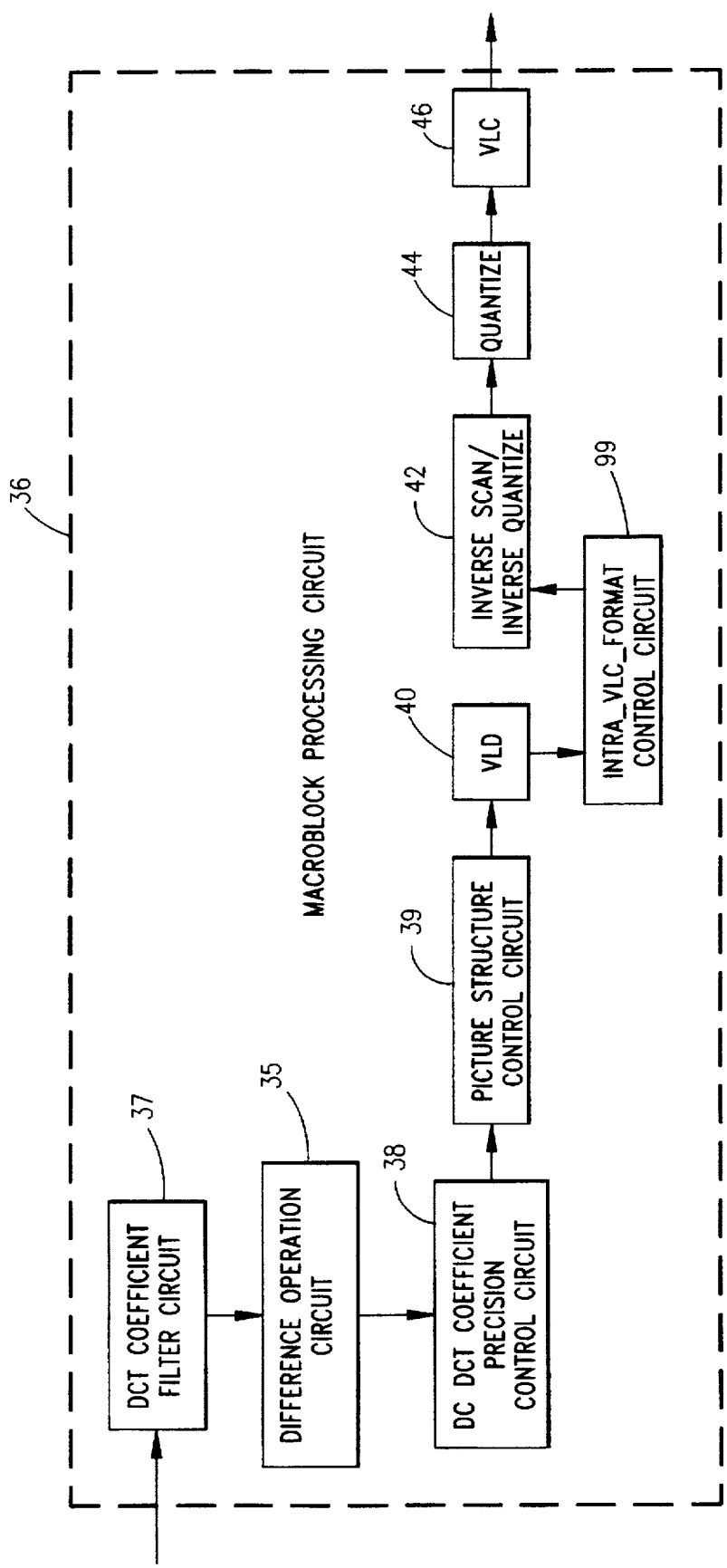
FIG. 3 is a schematic block diagram of an exemplary macroblock processing circuit implemented in accordance with one embodiment of the present invention.

As illustrated in FIG. 3, the macroblock processing circuit 36 includes a DCT coefficient filter circuit 37 for removing AC DCT coefficients from each macroblock prior to storage. The filter circuit 37 is incorporated into the macroblock processing circuit 36 when it is desired to use the DC DCT coefficients without the AC DCT coefficients, e.g., to reduce data storage requirements, to represent the selected macroblocks. The output of the filter circuit 37 is coupled to a difference operation circuit 35.

If more than one intra-macroblock arrives consecutively within a slice, the DC DCT Coefficients will arrive differentially encoded. In accordance with the present invention the difference operation circuit 35 reverses the difference operation for differentially encoded macroblocks prior to their storage. Accordingly DC DCT coefficients are stored in the storage device 16 using their actual values. This facilitates the later combination of the stored intra-coded macroblocks into slices and ultimately a fully intra-coded video frame.

For better image quality, at: the cost of grater complexity, more than just the DC DCT coefficients of each macroblock can be used to represent the selected intra-frame macroblocks. For example, the first 8 amplitude/runlength pairs may be used, in addition to the DC DCT coefficients, to represent each selected macroblock.

In accordance with the present invention, when less than a low resolution representation of a selected macroblock is stored, as opposed to a full resolution representation, the mquant value associated with the low resolution representation is stored along with the actual macroblock data.

As illustrated in FIG. 3, the macroblock processing circuit 36, further comprises a DC DCT coefficient precision control circuit 38, which is coupled to a picture structure control circuit 39. The picture control circuit 39 is, in turn, coupled to the input of a variable length decoder circuit 40. The variable length decoder circuit 40 has an output coupled to the input of an intra_vlc_format control circuit which, in turn, has an output coupled to the input of an inverse scan inverse quantization circuit 42. The output of the circuit 42 is coupled to the input of a quantizor 44 which has an output coupled to the input of a variable length encoder circuit 46.

As discussed above, the various circuits of the macroblock processing circuit operate together to process the macroblocks selected for storing in the storage device 16 so that they can be later combined into a single fully Intra-coded video frame. They also serve to reduce the amount of data required to represent the macroblocks corresponding to a video frame and to thereby reduce the amount of data required to represent a video frame.

Accordingly, the macroblock processing circuit 36 may be used as a data reduction circuit, e.g., to process the macroblocks corresponding to an I-frame and to produce a low resolution I-frame therefrom in a system where I-frames are available.

Circuits 35, 38, and 39 are used to process the DC DCT coefficients of the selected macroblocks. Circuits 40, 42, 44, and 46 on the other hand, which are used to process AC DCT coefficients, are unnecessary if only DC DCT coefficients are used to represent the selected macroblocks. Accordingly, in some embodiments, e.g., where filter circuit 37 is used, circuits 40, 42, 44, and 46 are omitted from the macroblock processing circuit 36.

Because of the great flexibility of MPEG-2, there are difficulties that can arise when combining macroblocks from several frames into a single frame. Some of the parameters that MPEG-2 allows to be changed for each picture that can cause difficult when combining several pictures with different values into a single intra-coded frame are: intra_dc_precision, intra_vlc_format, picture structure, q_scale_type, alternate_scan, and top_field first. The first of these parameters is of interest when only DC coefficients are being used while the remaining four parameters are of interest when DC and AC coefficients are used.

The circuits of the macrobhock processing circuit 36 are designed to resolve the problems that can be associated with the various parameters that MPEG-2 permits to be altered as will be discussed below.

The parameter intra_dc_precision is used to indicate the number of bits of precision used to represent DC DCT coefficients. In MPEG-2, DC DCT coefficients may be represented with 8, 9, or 10 bits of precision. In order to insure consistency in the way DC DCT coefficients are represented, the DC DCT coefficient control circuit 38 detects the degree of precision used and reduces the precision to 8, if 9 or 10 bits of precision were used to represent the DC DCT coefficients of the selected macroblocks. For inputs with 9 or 10 bits of precision, the operation requires simply dropping 1 or 2 bits, respectively. Such a decrease in precision should not have a significant impact on image quality and should reduce memory requirements for the storage device 16 since it need not be capable of storing the additional two bits of precision which are dropped for each DC DCT coefficient.

In MPEG-2 the parameter intra_vlc_format is used to indicate which one of two different VLC tables, the default or the alternate, is used for representing amplitude/runlength coefficients in intra-coded macroblocks.

In accordance with one embodiment of the present invention, after variable Length decoding is performed on the macroblocks being processed by the variable length decoder circuit 40, the intra_vlc_format control circuit detects when the macroblocks output by the decoder are represented using the alternate_vlc_format and then processes the detected macroblocks Lo map them into the default intra_vlc_format so that all the macroblocks are represented using the default intra_vlc_format. The default intra_vlc_format is the better intra_vlc_format for data reduction purposes because an End of Block (EOB) symbol which is required by MPEG-2 for each macroblock, is represented using 2bits in the default intra_vlc_format but represented using 4 bits in the alternate intra_vlc_format. Accordingly, the data reduction achieved by using the default intra_vlc_format as opposed to the alternate intra_vlc_format can be significant particularly when large amount of data reduction are performed, e.g., when only DC DCT coefficients are used.

In MPEG-2 the parameter picture_structure is used to indicate whether a picture is being represented as a field picture or a frame picture. There is a problem when trying to combine macroblocks from both field pictures and frame pictures into the same picture, because one macroblock in one type overlaps two macroblocks in the other type.

In accordance with the present invention, in one embodiment, macroblock storage is based on frame pictures. In such an embodiment, the picture structure control circuit 39, detects when selected macroblocks representing field pictures arrive, and then proceeds to map the detected macroblocks' DCT coefficients into both of the macroblocks it overlaps in a frame picture format.

In an alternate embodiment of the present invention, macroblock storage is based on field pictures. In such an embodiment, the picture structure control circuit 39, detects when selected macroblocks representing frame pictures arrive, and then proceeds to map the detected macroblocks' DCT coefficients into the macroblock it overlaps in field picture Format.

In the above manner, by mapping the macroblocks into either a frame picture format of a field picture format it is possible to store the received macroblocks in a consistent format that readily permits their combination into a single fully intra-coded video frame comprising macroblocks from a plurality of different video frames. The alternate_scan, q_scale_type and quant_matrix_extension parameters are only important when AC DCT coefficients are used in conjunction with DC DCT coefficients to represent the selected intra-coded macroblocks being stored.

The alternate_scan parameter indicates which one of two different scan patterns for converting the 2-dimensional DCT block into a 1-dimensional sequence, for amplitude/runlength coding, was used to generate a selected macroblock.

In accordance with the present invention after variable length decoding is performed by the variable length decoder circuit 40, the inverse scan/inverse quantizer circuit 42 maps any alternate_scan macroblock into the default zig-zag scan pattern. With such a remapping operation, there is no loss in picture quality. It should be noted that this remapping operation is not needed for DC DCT coefficients because the DC DCT coefficient is the first coefficient for both of the two possible scan methods.

The parameter q_scale_type is used to indicate which of two tables is used to convert the mquant into a quantization scale multiplier. In accordance with the present invention, the default q_scale_type will be used for trick play pictures. If the effective multiplier for the alternate q_scale_type can be represented by a mquant value of the default q_scale_type, the non default type mquant values are simply changed by the inverse scan/inverse quantize circuit to the corresponding default q_scale_type value. However, if the effective multiplier does not exist, in one embodiment, the closest existing value of mquant is used. Unfortunately, while this approach has the advantage of being relatively simple to implement, it has an adverse impact on image quality.

As an alternative to using the closest standard mquant value. In the embodiment illustrated in FIG. 3, the inverse quantization circuit 42 is used in combination with the quantization circuit 44 to inverse quantize She macroblock with the correct scale factor and then requantize it with the closest mquant value in the default table. While the implementation cost of this approach is expected to be higher then the previously described approach, it is should produce less of a decrease in image quality. There is no need to address the issue of q_scale_type for DC DCT coefficients because the DC DCT coefficient is not quantized below 8 bits in MPEG-2.

The parameter quant_matrix_extension allows for a change in the quantization matrix from the default quantization matrix. When a quantization matrix other than the default matrix is used it is necessary to inverse quantize using the input quantization matrix and requantize using the default quantization matrix. The inverse quantization circuit 42 and quantization circuit 44 are used for this function when it is detected that a non-default quantization matrix was originally used to quantize the selected macroblocks.

The algorithm of the present invention for processing selected macroblocks to insure that they conform to the same parameters may be described by the following sequence of operations: variable length decode, inverse zigzag scan, inverse quantize, requantize, zig-zag scan and variable length encode. The variable length encoding of the selected and processed macroblocks is performed by the variable length coding ("VLC") circuit 46 just prior to the selected intra-coded macroblocks being stored in the storage device 18.

It should be noted that when the selected and processed macroblocks are to be stored in fixed length format, variable length encoding is not performed prior to storage but rather after storage. Accordingly, in such an embodiment, the variable length encoder 46 is located between the storage device 16 and the frame forming circuit 18 and not between the quantizer 44 and the storage device 16 as illustrated in the embodiment of FIG. 3.

To insure that the AC DCT coefficients are stored in a consistent manner the variable length decoder circuit 40, inverse scan/inverse quantize circuit 42, quantization circuit 44 and variable length decoder circuit 40 are used.

Figure 4:
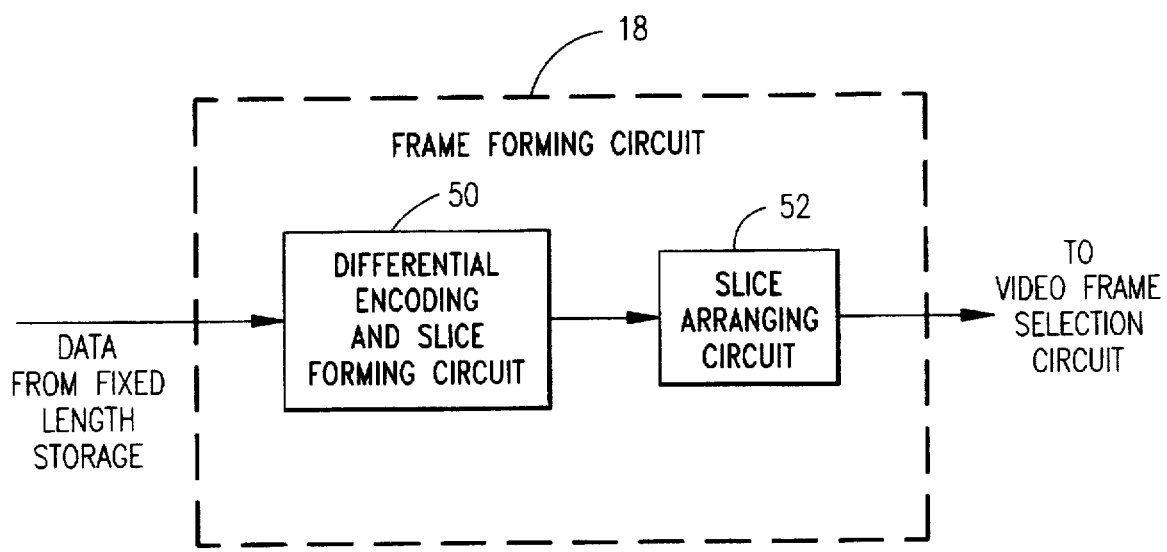
FIG. 4 is a schematic block diagram illustrating a frame forming circuit suitable for use as the frame forming circuit of FIG. 1.

Referring now to FIG. 4, the operation of the frame forming circuit 18 will be described in greater detail. The frame forming circuit 18 is responsible for receiving from the storage device 16 the set of intra-coded macroblocks that have been selected to represent the composite fully intra-coded video frame being generated and to process the intra-coded macroblocks into a single video frame, e.g., an MPEG-2 compliant video frame.

The frame forming circuit 18 includes a differential encoding and slice forming circuit 50 that receives the intra-coded macroblocks from the fixed storage device 16 and differentially encodes the intra-coded macroblocks into slices.

The slices may be of any size, e.g., number of macroblocks, from one macroblock upto the total number of macroblocks that comprise an entire row, as permitted by MPEG-2. The use of slices with a large number of macroblocks to represent a frame will require less data than representing the same frame using a larger number of slices with fewer macroblocks each. However, it should be noted that the use of large slices will tend to propagate errors throughout: a larger area of the frame and therefore may be less desirable in some cases than the use of more smaller slices to represent a frame.

The slices generated by the differential encoding and slice forming circuit are supplied to the slice arranging circuit 52 which adds appropriate header information and arranges the slices into the fully intra-coded frame being generated. The fully intra-coded frame generated by the slice arranging circuit 52 is supplied to the input of the video frame selection circuit 20 which selects fully intra-coded frames to be used for different speeds and directions of VR operation.

While the above method and apparatus are designed to extract intra-coded data from an MPEG-2 compliant bitstream when progressive refresh is used, the circuit 10 can be simplified if certain restrictions are made at the time of encoding, i.e., at the time the progressive refresh bitstream is produced, to make subsequent data extraction simpler. The present invention contemplates two restrictions with two associated simplifications.

The first restriction is to not allow the following parameters to change for different pictures of the same sequence as permitted by MPEG-2: alternate_scan, intra_dc_precision, intra_vlc_format, q_scale_type, the quant_matrix, picture_structure and top_field first. With these restrictions, the use of the inverse quantizer, quantizer, inverse scan, and zig-zag scan are no longer needed for data extraction. However, the VLD and VLC operations will still be needed in some cases and low resolution fixed length frame storage will also probably still be required.

If a second restriction is also made, i.e., that the progressive intra-refresh always updates entire rows of macroblocks ("a stripe"), than the VLD and VLC operation will not be required. Instead algorithms used for selecting I-frames, such as those discussed in U.S. patent application Ser. No. 08/298,524, titled "METHOD AND APPARATUS FOR THE SELECTION OF DATA FOR USE IN VTR TRICK PLAYBACK OPERATION IN A SYSTEM USING INTRA-CODED VIDEO FRAMES" filed on even date herewith and expressly incorporated by reference, can be used, where codewords are merely parsed and selected for inclusion in the bitstream. However, while the maximum size of a trick play compressed frame, e.g., 1 Mbit, serves as the maximum data limitation in the case when I-frames are being used for trick play. For progressive refresh with the "stripe" restriction, each stripe must fit into a fixed length area, the size of which is the maximum data limitation when I-frames are being used divided by the number of stripes, e.g. 1 Mbit divided by the number of stripes. While some quality may be lost as a result of this restriction, acceptable fully intra-coded frames for trick play use should still result.

What is claimed is:

1. A method of combining intra-coded macroblocks to form a single fully intra-coded video picture, from video data representing M inter-coded pictures, each inter-coded picture including N macroblocks, the first through $N^{th}$ macroblocks in each set of N macroblocks corresponding to first through $N^{th}$ macroblock positions within a video picture, respectively, each set of N macroblocks including at least one of an intra-coded macroblock and an inter-coded macroblock, the method comprising the steps of:

a) providing a memory device including N memory locations, each one of the N memory locations being associated with one of the first through $N^{th}$ macroblock positions within a video picture;

b) receiving the video data representing M inter-coded pictures;

c) identifying the intra-coded macroblocks included in the first of the M pictures and the macroblock positions within a video picture to which the identified intra-coded macroblocks correspond;

d) recording, each one of the identified intra-coded macroblocks in the one of the N memory locations associated with the macroblock position within a video picture to which the one of the identified macroblocks being recorded corresponds; and e) combining intra-coded macroblocks from different inter-coded pictures by performing the steps of:
    i. identifying the intra-coded macroblocks included in a next one of the M inter-coded pictures and the macroblock positions within a video picture to which the identified intra-coded macroblocks correspond;

ii. recording, each one of the identified intra-coded macroblocks in the one of the N memory locations associated with the macroblock position within a video picture to which the one of the identified macroblocks being recorded corresponds; and iii. repeating steps (i) and (ii) to record an intra-coded macroblock in each one of the N memory locations, the macroblocks recorded in the N memory locations forming the single fully intra-coded video picture.

2. A method of selecting intra-coded macroblocks to represent a single fully intra-coded video image, from video data representing a series first through $M^{th}$ inter-coded video images, the video data representing each inter-coded video image including a plurality of macroblocks, each of the plurality of macroblocks corresponding to a different position within the inter-coded video image and including at least one of an intra-coded macroblock and an inter-coded macroblock, where M is an integer, the method comprising the steps of:

a) receiving the video data representing the series of first through $M^{th}$ inter-coded video images;

b) selecting a set of intra-coded macroblocks, from the plurality of macroblocks that represent the first inter-coded video image, that correspond to at least a minimum preselected number of adjacent positions within the first inter-coded video image;

c) storing in a memory device the set of intra-coded macroblocks selected from the plurality of macroblocks that represent the first inter-coded video image;

d) processing the plurality of macroblocks that represent the next inter-coded video image in the series of M inter-coded video images by performing the steps of:

i) selecting a set of intra-coded macroblocks for storing in the memory device, from the plurality of macroblocks that represent the next video image, by identifying a set of intra-coded macroblocks that corresponds to at least a minimum preselected number of adjacent positions within the next inter-coded video image;

ii) storing in the memory device the selected set of intra-coded macroblocks thereby replacing any previously stored intra-coded macroblocks that correspond to the same position within a video image as the macroblocks being stored; and e) repeating step (d) until the macroblocks representing the series of M inter-coded video images are processed, the stored intra-coded macroblocks representing the macroblocks selected to represent the single fully intra-coded video image.

3. A method of selecting intra-coded macroblocks to represent a single fully intra-coded video picture, from video data representing a series first through $M^{th}$ video pictures, the video data representing each video picture including a plurality of macroblocks, each of the plurality of macroblocks corresponding to a different position within the video picture and including at least one of an intra-coded macroblock and an inter-coded macroblock, where M is an integer, the method comprising the steps of:

a) receiving the video data representing the series of first through $M^{th}$ video pictures;

b) selecting a set of intra-coded macroblocks, from the plurality of macroblocks that represent the first video picture, that correspond to at least a minimum preselected number of adjacent positions within the first video picture;

c) storing in a memory device the set of intra-coded macroblocks selected from the plurality of macroblocks that represent the first video picture;

d) processing the plurality of macroblocks that represent the next video picture in the series of M video pictures by performing the steps of:

i) selecting a set of intra-coded macroblocks for storing in the memory device, from the plurality of macroblocks that represent the next video picture, by identifying a set of intra-coded macroblocks that corresponds to at least a minimum preselected number of adjacent positions within the next video picture;

ii) comparing the intra-coded macroblocks of the selected set to any stored macroblocks corresponding to the same locations within a picture to which the macroblocks of the selected set correspond; and iii) when the comparison operation indicates that the selected set of macroblocks includes more macroblocks than there are stored macroblocks corresponding to the same locations within a picture to which the macroblocks of the selected set corresponds:

storing in the memory device the selected set of intra-coded macroblocks thereby replacing any previously stored intra-coded macroblocks that correspond to the same position within a video picture as the macroblocks being stored; and e) repeating step (d) until the macroblocks representing the series of M video pictures are processed, the stored intra-coded macroblocks representing the macroblocks selected to represent the single fully intra-coded video picture.

4. The method of claim 3, wherein the received macroblocks are variable Length encoded, further comprising the step of:

converting the received variable length encoded macroblocks into fixed lenagth encoded macroblocks prior to selecting sets of macroblocks for storing in the memory device.

5. The method of claim 4, wherein the macroblocks selected for storing in the memory device include DC discrete cosine transform coefficients and AC discrete cosine transform coefficients, and wherein the method further comprises the step of:

removing the AC discrete cosine transform coefficients from the macroblocks selected for storing in the memory device prior to storing the selected macroblocks.

6. The method of claim 4, wherein each of the macroblocks selected for storing in the memory device includes a plurality of amplitude run length pairs, the method further comprising the step of:

removing from the series of amplitude run length pairs included in the macroblock all but the first X preselected amplitude run length pairs, where X is an integer.

7. The method of claim 6, wherein X is eight.

8. The method of claim 3, wherein the plurality of macroblocks includes DC discrete cosine transform coefficients and AC discrete cosine transform coefficients, and wherein the method further comprises the step of:

removing the AC discrete cosine transform coefficients from the macroblocks selected for storing in the memory device prior to storing the selected macroblocks.

9. The method of claim 5, wherein each DC cosine transform coefficients represented by at least 8 bits of precision and wherein the method further comprises the step of:

detecting the DC discrete cosine transform coefficients to 8 bits of precision by dropping any bits of the detected DC discrete cosine transform coefficients chat exceed 8 bits.

10. An apparatus for generating a fully intra-coded video frame from data Included in a digital video data stream, the digital video data stream including a plurality of intra-coded and inter-coded macroblocks, each macroblock corresponding to one of a plurality of video frames and a macroblock position within the video frame to which the macroblock corresponds, the apparatus comprising:

intra-coded video data identification means for identifying each intra-coded macroblock in the digital video data stream, for determining the one of the video frames to which each identified macroblock corresponds, and the macroblock position within the video frame to which the macroblock corresponds;

intra-coded macroblock storage means for storing intra-coded macroblocks used to generate the fully intra-coded video frame, the intra-coded macroblock storage means including N storage locations, each one of the N storage locations corresponding to a different one of N possible macroblock positions within a frame, wherein N is an integer number corresponding to the number of macroblocks used to represent the fully intra-coded video frame being generated and each one of the plurality of video frames in the digital video data stream;

macroblock selection means coupled to the intra-coded video data identification means and the intra-coded macroblock storage means for selecting from the identified intra-coded macroblocks, as a function of the macroblock position within a video frame to which the identified intra-coded macroblocks correspond, intra-coded macroblocks to be stored in the intra-coded macroblock storage means; and indicator means coupled to the macroblock selection means for indicating when an intra-coded macroblock has been stored in each one of the N macroblock positions within a video frame, the stored macroblocks representing the fully intra-coded video frame being generated.

11. The apparatus of claim 10, further comprising:

frame forming means coupled to the intra-coded macroblock storage means for receiving from the macroblock storage means the stored intra-coded macroblocks representing the fully intra-coded video frame being generated, for processing the received intra-coded macroblocks into slices, and for combining the slices to form the fully intra-coded video frame being generated.

12. The apparatus of claim 11, further comprising:

macroblock processing means, coupled to the macroblock selection means and the intra-coded macroblock storage means, for processing the intra-coded macroblocks selected for storing in the macroblock storage means to reduce the amount of data used to represent each of the selected intra-coded macroblocks.

13. The apparatus of claim 12, wherein each one of the selected macroblocks includes AC DCT coefficients and wherein the macroblock processing means includes means for filtering the AC DCT coefficients from the selected macroblocks.

14. The apparatus of claim 13, wherein the selected macroblocks include DC DCT coefficients, and wherein the macroblock processing means includes means for detecting differentially encoded DC DCT coefficients and for reversing the differential encoding to determine the actual DC DCT coefficient values of the selected differentially encoded macroblocks.

15. The apparatus of claim 14, wherein the macroblock processing means further includes:

means for detecting the number of bits of precession used to represent each DCT coefficient of the selected macroblocks and for reducing the precision to 8 bits for macroblocks that are represented using more than 8 bits of precision.

16. The apparatus of claim 12, wherein the selected macroblocks correspond to one of a field picture format and a frame picture format and wherein the macroblock processing means includes picture structure circuit means for detecting macroblocks corresponding to field pictures and for mapping the detected macroblocks into frame picture format prior to storage of the detected macroblock.

17. The apparatus of claim 12, wherein the selected macroblocks were originally generated using one of a default q_scale_type and an alternate q_scale_type value and wherein the macroblock processing means includes:

means for variable length decoding the selected macroblocks;

means for inverse quantizing the variable length decoded macroblocks originally generated using an alternate q_scale_type value and requantizing the selected macroblocks originally generated using an alternate q_scale_type value using a default q_scale_type value; and means for variable length encoding the requantized macroblocks.

18. The apparatus of claim 12, wherein the selected macroblocks were originally generated using one of a default quantization matrix and an alternate quantization matrix and wherein the macroblock processing means includes:

means for variable length decoding the selected macroblocks;

means for inverse quantizing selected macroblocks originally generated using the alternate quantization matrix and requantizing the selected macroblocks originally generated using the alternate quantization matrix using the default quantization matrix; and means for variable length encoding the requantized macroblocks.

19. The apparatus of claim 12, wherein the selected macroblocks are of a default intra_vlc_format type or an alternate intra_vlc_format type and wherein the macroblock processing means includes:

means for variable length decoding the selected macroblocks;

means for detecting macroblocks of the alternate intra_vlc_format type and for converting the detected macroblocks to the default intra_vlc_format type; and means for variable length encoding the default intra_vlc_format type macroblocks.

20. The apparatus of claim 12, wherein the selected macroblocks are of a default zig_zag scan type or an alternate_scan type and wherein the macroblock processing means includes:

means for variable length decoding the selected macroblocks;

means for inverse scanning and inverse scanning quantizing selected macroblocks;

means for quantizing the inverse scanned and inverse quantized macroblocks using the default zig_zag scan pattern during quantization to thereby convert alternate_scan type macroblocks to default zigzag scan type macroblocks; and means for variable length encoding the quantized macroblocks.

21. A method of generating a fully intra-coded video image from a plurality of different inter-coded video images, each inter-coded video image including inter-coded video data and intra-coded video data, the method comprising the steps of:

identifying intra-coded video data included in the plurality of different inter-coded video images;

combining at least a portion of the identified intra-coded video data from the plurality of different inter-coded video images to form a completely intra-coded video image therefrom.

22. The method of claim 21, wherein the video images are frames, the inter-coded and intra-coded video data includes macroblocks and wherein the step of identifying the intra-coded video data includes the step of identifying sets of intra-coded macroblocks that correspond to at least a minimum preselected number of adjacent positions within a video frame.

23. The method of claim 22, wherein the step of combining at least a portion of the identified intra-coded video data includes the step of:

storing in a memory device the identified sets of intra-coded macroblocks.

24. The method of claim 23, wherein the intra-coded macroblocks are variable length encoded, and wherein the method further comprises the step of converting the variable length encoded macroblocks into fixed length encoded macroblocks prior to performing the storing step.

* * * * *